(12) United States Patent
Wang et al.

(10) Patent No.: US 7,142,394 B2
(45) Date of Patent: Nov. 28, 2006

(54) METHOD AND APPARATUS FOR AN IMPROVED MAGNETIC HEAD ARM ASSEMBLY

(75) Inventors: Jeffery L. Wang, Tai Po (HK); Takehiro Kamigama, Kowloon Tong (HK); Chi Hung Yuen, Kowloon (HK); Liu Jun Zhang, Dongguan (CN)

(73) Assignee: SAE Magnetics (H.K.) Ltd., Shatin (HK)

( * ) Notice: Subject to any disclaimer, the term of this patent is extended or adjusted under 35 U.S.C. 154(b) by 455 days.

(21) Appl. No.: 10/640,357

(22) Filed: Aug. 13, 2003

(65) Prior Publication Data
US 2004/0150917 A1     Aug. 5, 2004

(30) Foreign Application Priority Data
Jan. 30, 2003    (WO) ..................... PCT/CN03/00104

(51) Int. Cl.
G11B 5/48    (2006.01)
G11B 5/60    (2006.01)

(52) U.S. Cl. .................................................. 360/244.2
(58) Field of Classification Search ............. 360/265.7, 360/265.9, 244.2, 244.5, 245.2
See application file for complete search history.

(56) References Cited
U.S. PATENT DOCUMENTS

| 5,313,353 | A | 5/1994 | Kohso et al. ............... 360/104 |
| 5,870,252 | A | 2/1999 | Hanrahan ................... 360/104 |
| 5,940,251 | A | 8/1999 | Giere et al. ................. 360/104 |
| 5,978,178 | A * | 11/1999 | Adley ....................... 360/244.4 |
| 6,055,133 | A * | 4/2000 | Albrecht et al. .......... 360/245.2 |
| 6,700,744 | B1 * | 3/2004 | Nishida et al. ........... 360/244.2 |
| 6,765,761 | B1 * | 7/2004 | Arya ......................... 360/244.7 |
| 6,937,443 | B1 * | 8/2005 | Wang et al. .............. 360/265.8 |

FOREIGN PATENT DOCUMENTS

| EP | 0 487 914 A3 | 10/1991 |
| JP | 04114376 A * | 4/1992 |
| JP | 11-203809 | 1/1998 |
| WO | WO 9909555 A1 * | 2/1999 |
| WO | WO 200295737 A1 * | 11/2002 |

OTHER PUBLICATIONS

"Stacked disc drive actuator with high stiffness and adhesively bonded—includes texturing interface surfaces of components to endure good flow of adhesive and clamping arms, yoke and spacer ring to form E-block component," Sep. 10, 1999, Research Disclsoure (RD), Pub. No. 425066 A.*

* cited by examiner

Primary Examiner—William J Klimowicz
(74) Attorney, Agent, or Firm—Kenyon & Kenyon LLP

(57) ABSTRACT

A system and method for an improved magnetic head arm assembly (HAA), reducing complexity of design and difficulty of manufacture, is disclosed.

18 Claims, 3 Drawing Sheets

Section A - A

METHOD AND APPARATUS FOR AN IMPROVED MAGNETIC HEAD ARM ASSEMBLY

BACKGROUND INFORMATION

The present invention relates to magnetic hard disk drives. More specifically, the present invention relates to a system for an improved magnetic head arm assembly (HAA).

Among the better known data storage devices are magnetic disk drives of the type in which a magnetic head slider assembly floats on an air bearing at the surface of a rotating magnetic disk. Such disk drives are often called 'Winchester'-type drives. In these, one or more rigid magnetic disks are located within a sealed chamber together with one or more magnetic head slider assemblies. The slider assemblies may be positioned at one or both sides of the magnetic disks.

Typically, each magnetic head slider assembly in magnetic disk drives of the type referred to is coupled to the outer end of an arm or load beam. FIG. 1 provides a perspective view of a typical magnetic head arm (HAA) assembly 108. The slider 102 is mounted in a manner which permits gimbaled movement at the free outer end of the suspension 106 such that an air bearing between the slider assembly 102 and the surface of the magnetic disk can be established and maintained. The elongated suspension 106 is coupled to an appropriate mechanism, such as a voice-coil motor (VCM) (not shown), for moving the suspension 106 across the surface of the disk (not shown) so that a magnetic head contained within the slider 102 can address specific concentric data tracks on the disk for writing information on to or reading information from the data tracks.

In order to achieve a quick response ability, a focus has been placed on reducing the weight (and thus, the inertial effects) of the HAA 108. A typical means of achieving this has been to reduce the thickness 110 of the HAA 108. To prevent HAA 108 operational flexure (and thus, poor tracking) and/or unintentional deformation during the assembly processes, rib elements 112 are utilized (such as in U.S. Pat. No. 5,313,353 of Kohso et al.). The rib elements 112 reduce the tendency of the HAA 108 to flex towards and away from the disk surface.

Problems with this design 108 include the complexity of design and difficulty of manufacture. Many complex cutting and bending processes must be performed to produce this HAA baseplate 108. This greatly affects quality control as well as cost of production. It is therefore desirable to have a system and method for an improved magnetic head arm assembly (HAA) that avoids the above-mentioned problems, in addition to other advantages.

DETAILED DESCRIPTION

Figure 1:
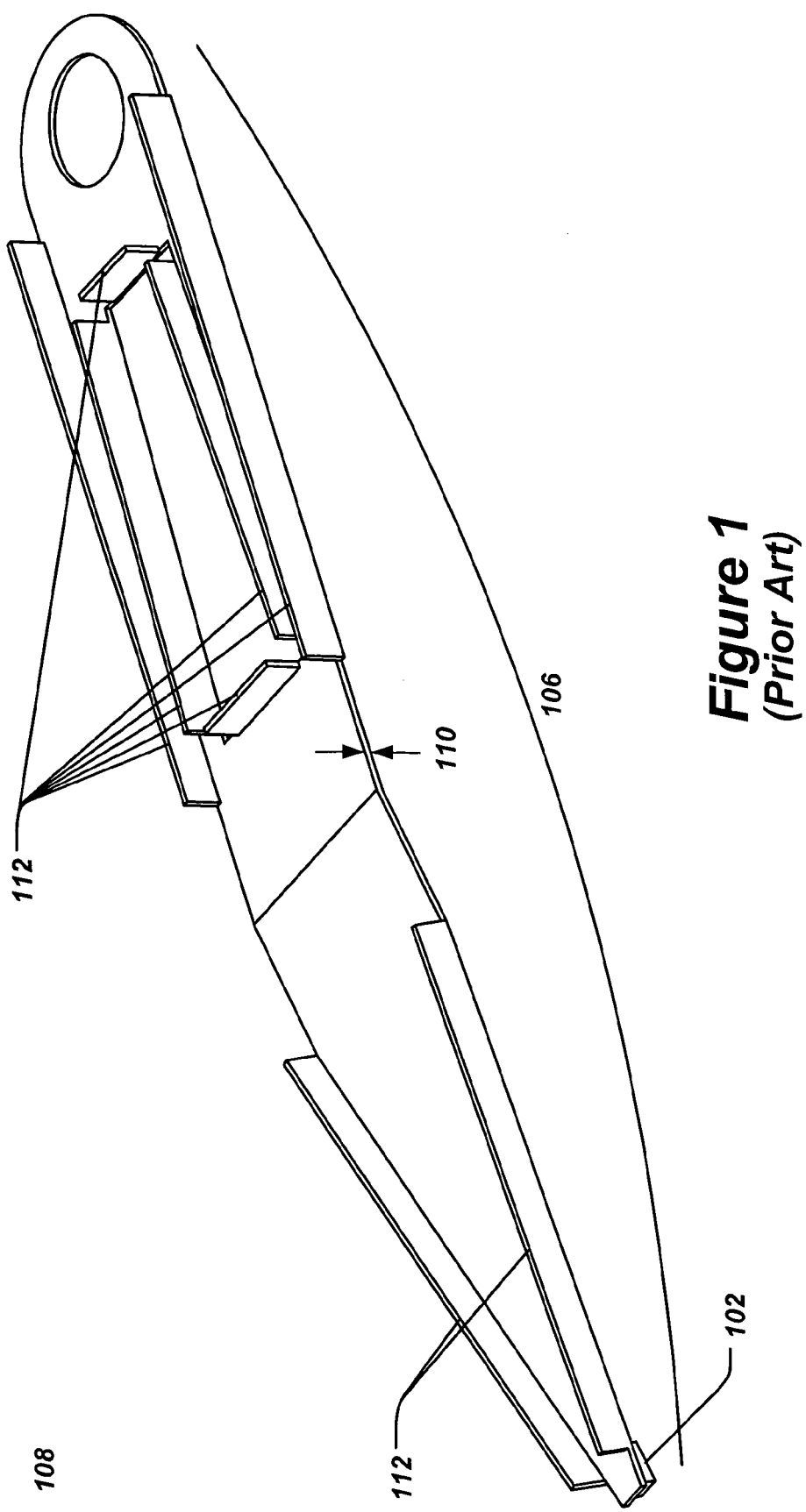
FIG. 1 provides a perspective view of a typical magnetic head arm assembly (HAA).
Figure 2:
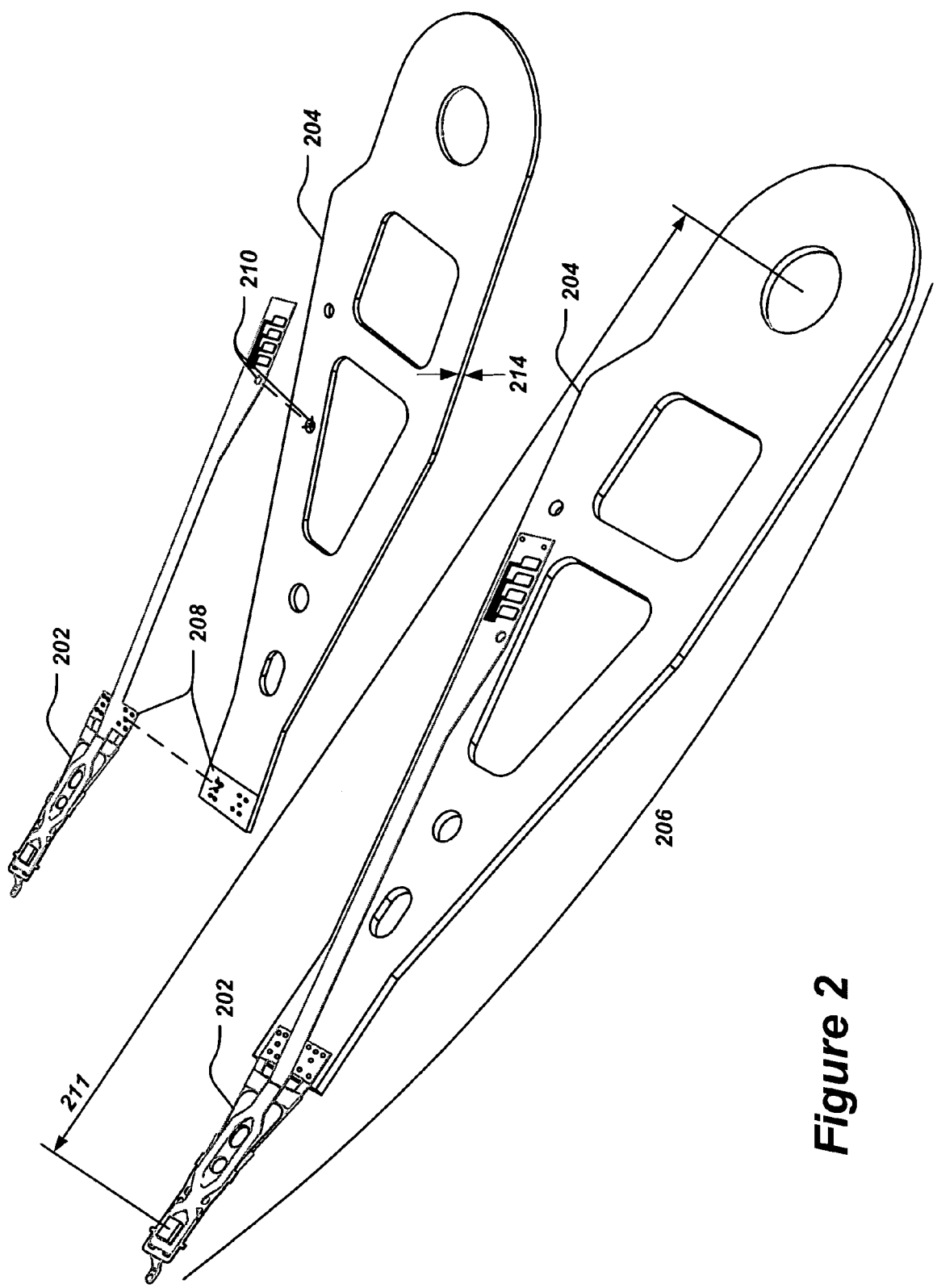
FIG. 2 illustrates Head Arm Assembly (HAA) design and assembly according to an embodiment of the present invention.

FIG. 2 illustrates Head Arm Assembly (HAA) design and assembly according to an embodiment of the present invention. In this embodiment, an HAA structure 206 includes a flexure/load beam assembly 202 and a unimount suspension arm 204. The suspension arm 204 is formed from a uniform piece of material. In one embodiment the suspension arm is made from a material that has a high Young's Modulus(Y)-to-density(D) ratio, such as Aluminum with $Y/D=110$ Mpsi/$(lb/in^3)$ ($Y=11$ Mpsi (megapounds per square inch) and $D=0.10$ $lb/in^3$ (pounds per cubic inch)) or Titanium with $Y/D=106$ Mpsi/$(lb/in^3)$ ($Y=17$ Mpsi and $D=0.16$ $lb/in^3$). In an embodiment, the suspension arm 204 is of a material having a Y/D of at least 100 Mpsi/$(lb/in^3)$.

In one embodiment of the present invention, the suspension arm 204 has a thickness 214 of at least 0.7 millimeters (mm), and in one embodiment, the thickness of the suspension arm 204 is 0.8 mm. Further, in an embodiment, the thickness is at least 2.5% the length 211 of the HAA 206 (axis of rotation to magnetic head). For example, a 2.5 inch hard disk drive (HDD), having a 28.5 mm length HAA 206, in one embodiment of the invention has a suspension arm thickness 214 of at least 0.7 mm (2.5% the length).

In one embodiment, the unimount suspension arm 204 is coupled to the flexure/load beam assembly 202 to form the HAA 206. In an embodiment, the coupling is performed by laser welding overlapping portions 208 of the two components 202,204. In an alternative embodiment, thermosetting epoxy is utilized to couple the two components 202,204. In an embodiment, alignment holes 210 are utilized to accurately position the components 202,204 upon one another.

Figure 3:
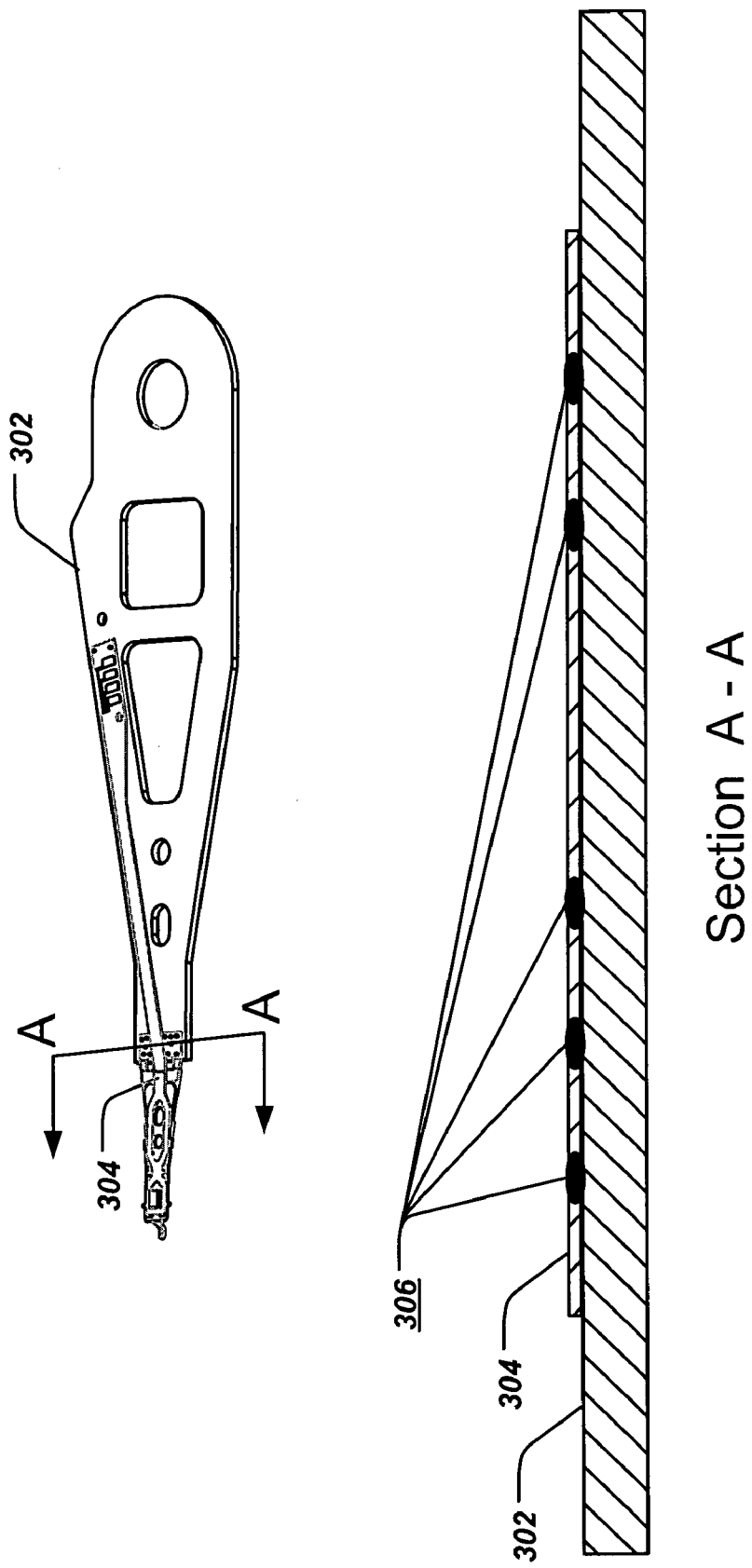
FIG. 3 provides a cross-section view of the coupling between the unimount suspension arm and the flexure/load beam assembly under principles of the present invention.

FIG. 3 provides a cross-section view of the coupling between the unimount suspension arm 302 and the flexure/load beam assembly 304 under principles of the present invention. As stated above, in one embodiment laser welding 306 is utilized to join the two components 302,304. In one embodiment, spot welds are performed at several locations 306 (See also FIG. 2).

Although several embodiments are specifically illustrated and described herein, it will be appreciated that modifications and variations of the present invention are covered by the above teachings and within the purview of the appended claims without departing from the spirit and intended scope of the invention.

The invention claimed is:

1. A system for a magnetic head arm assembly (HAA) comprising:
    a load beam portion coupled via welding to a suspension arm portion to form a suspension assembly, wherein
    said suspension arm portion is a metal having a Young's Modulus(Y)-to-density(D) ratio of at least 100 Mpsi/$(lb/in^3)$; and
    said suspension arm portion has a thickness at least 2.5% the length of the HAA from an axis of rotation to a magnetic head.

2. The system of claim 1, wherein said load beam portion is coupled to said suspension arm portion via laser welding.

3. The system of claim 1, wherein said load beam portion is coupled to said suspension arm portion via thermosetting epoxy.

4. The system of claim 1, wherein said load beam portion is a flexure/load beam assembly.

5. The system of claim 1, wherein said suspension arm portion is a unimount suspension arm.

6. The system of claim 1, wherein said suspension arm portion has a Y-to-D ratio of 110 Mpsi/$(lb/in^3)$.

7. The system of claim 1, wherein said suspension arm portion is Aluminum.

8. The system of claim 1, wherein said suspension arm portion has a thickness 2.8% the length of the HAA from an axis of rotation to a magnetic head.

9. A system for a magnetic head arm assembly (HAA) comprising:
- a suspension arm portion coupled via welding to a load beam portion to form a suspension assembly, wherein
- said suspension arm portion is a metal having a Young's Modulus(Y)-to-density(D) ratio of 100 Mpsi/(lb/in$^3$); and
- said suspension arm portion has a thickness at least 2.5% die length of the HAA from an axis of rotation to a magnetic head.

10. The system of claim 9, wherein said load beam portion is coupled to said suspension arm portion via laser welding.

11. The system of claim 9, wherein said load beam portion is a flexure/load beam assembly.

12. The system of claim 9, wherein said suspension arm portion is a unimount suspension arm.

13. The system of claim 9, wherein said suspension arm portion has a thickness 2.8% the length of the HAA from an axis of rotation to a magnetic head.

14. A system for a magnetic head arm assembly (HAA) comprising:
- a flexure/load beam assembly coupled via laser welding to a unimount suspension arm to form a unimount suspension assembly, wherein
- said unimount suspension arm is Aluminum; and
- said unimount suspension arm has a thickness at least 2.5% the length of the HAA from an axis of rotation to a magnetic head.

15. The system of claim 14, wherein said unimount suspension arm has a thickness 2.8% the length of the HAA from an axis of rotation to a magnetic head.

16. A system for a magnetic head arm assembly (HAA) comprising:
- a flexure/load beam assembly coupled via laser welding to a unimount suspension arm to form a unimount suspension assembly, wherein
- said unimount suspension arm is a metal having a Young's Modulus(Y)-to-density(D) ratio of at least 100 Mpsi/(lb/in$^3$); and
- said unimount suspension arm has a thickness of at least 0.7 mm.

17. The system of claim 16, wherein said unimount suspension arm is Aluminum.

18. The system of claim 16, wherein said unimount suspension arm has a thickness of 0.8 mm.

* * * * *

UNITED STATES PATENT AND TRADEMARK OFFICE
CERTIFICATE OF CORRECTION

| | | |
|---|---|---|
| PATENT NO. | : 7,142,394 B2 | Page 1 of 1 |
| APPLICATION NO. | : 10/640357 | |
| DATED | : November 28, 2006 | |
| INVENTOR(S) | : Jeffery L. Wang et al. | |

It is certified that error appears in the above-identified patent and that said Letters Patent is hereby corrected as shown below:

Column 3, line 12: "die" should be --the--

Signed and Sealed this

Nineteenth Day of May, 2009

JOHN DOLL
*Acting Director of the United States Patent and Trademark Office*